Aug. 26, 1952 G. O. SMITH 2,608,091
CAPACITOR MICROPHONIC TESTING APPARATUS
Filed Sept. 3, 1949
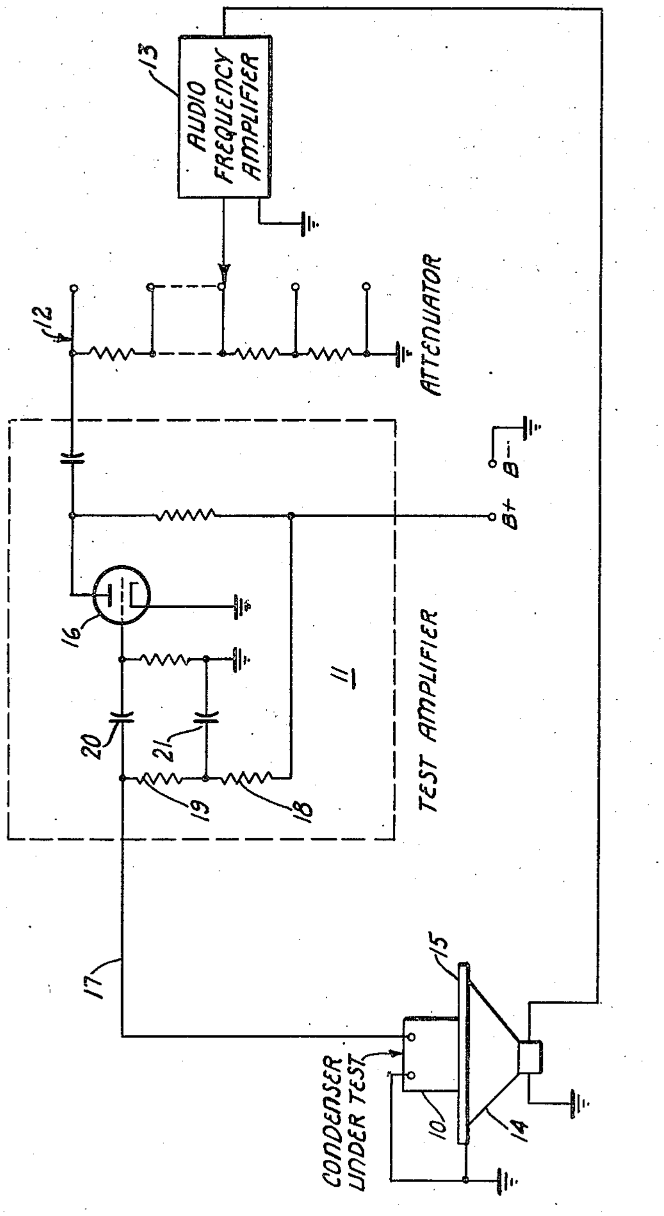
INVENTOR.
GEORGE O. SMITH
BY
Brown, Denk & Synnestvedt
AGENTS Patented Aug. 26, 1952 2,608,091

UNITED STATES PATENT OFFICE 2,608,091

CAPACITOR MICROPHONIC TESTING APPARATUS

George O. Smith, Philadelphia, Pa., assignor to Philco Corporation, Philadelphia, Pa., a corporation of Pennsylvania Application September 3, 1949, Serial No. 113,991

7 Claims. (Cl. 73—69)

The present invention relates broadly to condenser testing apparatus, and more particularly, to testing apparatus adapted to determine the microphonic response of condensers.

Since a condenser (or capacitor) consists of a plurality of dielectrically spaced conductors and since its capacitance is a function of this spacing, it is evident that vibration imparted to these conductors will produce a corresponding variation in the capacitance of the condenser. In certain circuit arrangements vibration of the condenser elements or assemblies may produce highly deleterious effects on the electrical operation of the circuit. Thus if the condenser is, for example, used as the tuning element of an amplitude-modulation receiver, vibration of the condenser plates will cause the receiver tuning to fluctuate at the frequency of vibration of the condenser plates. If the gain of the receiver is not uniform across the pass-band—and usually it is not—there will result a corresponding amplitude variation of the received signal which is detected along with the desired modulation and hence issues as sound from the loudspeaker. The sound waves thus developed impinge on the condenser plates, setting them again into vibration, thus completing a feedback path which may finally produce a spurious sound output due to mechanical condenser vibration which is well in excess of the desired sound output. This phenomenon is commonly referred to as being due to condenser microphonics.

In frequency-modulation receivers, vibration of the plates of the local-oscillator section of the gang condenser is especially serious. Here the vibrations produce corresponding fluctuations of the local oscillator frequency and this, in turn, frequency-modulates the intermediate frequency carrier at the vibration frequency. This frequency modulation component is detected by the receiver's frequency detector along with the desired component of modulation and, if the detected signal is reproduced with sufficient volume, the feedback of acoustic energy to the condenser may produce sustained oscillations at the natural frequency of condenser plate vibration.

Unfortunately, the most commonly employed tuning condenser is also the one most subject to disturbance by mechanical vibration. Reference is had, of course, to the conventional gang condenser whose air dielectric provides a minimum of damping for the spaced plates, thereby permitting very appreciable vibration in response to acoustic energy issuing from the loudspeaker. It will be understood, of course, that many other types of condensers, such as the trimmer condensers which often supplement the gang condenser, are also sensitive to mechanical vibration, but since the effect is most noticeable and injurious in the gang-type tuning condenser, the subsequent discussion will be more specifically directed thereto.

Since virtually every gang condenser, no matter how carefully constructed, exhibits such microphonics, provided the level of acoustic energy impinging thereon be sufficiently high, it becomes imperative to check samples of each newly-designed condenser in an effort to determine its microphonic response. Frequent tests during the production of a given condenser assembly are also necessary in order to insure uniformity of the product. In the past, tests intended to determine microphonic response have usually been carried out by placing the condenser under test near a loudspeaker, driving the loudspeaker with audio frequency signals, varying the frequency of these signals over the entire audio frequency spectrum, and detecting the amplitude variation with frequency of the output signal derived from the condenser. From observation of the peaks in this frequency characteristic, it was attempted to draw definite conclusions regarding the microphonic response of the condenser. Unfortunately, such data were exceedingly difficult to interpret, and even more difficult to correlate with similar observations made on other condensers. It was, therefore, a matter of great difficulty to set up uniform standards of performance and production.

Another important flaw in the prior-art test procedure lay in its inability to reveal the specific element which was causing the most pronounced microphonics. Thus, if, for example, pressure was applied by means of a probe to selected parts of the condenser in order to reduce vibration of these parts, the capacity of the condenser was ordinarily changed. This necessitated reexamination of the entire audio frequency spectrum by the time-consuming prior art method hereinbefore outlined in order to determine whether the probing had actually reduced the microphonics or had merely altered their frequency. Accordingly, it was virtually impossible to locate those parts of the assembled condenser which were responsible for the occurrence of microphonics, and therefore the tests were incapable of yielding reliable information on how to improve the condenser structure.

It is, accordingly, a primary object of the invention to provide improved test apparatus for determining the microphonic response of a condenser.

It is another object of the invention to provide test apparatus for reliably determining the microphonic response of a plurality of condensers, the individual responses being presented in such a form as to permit correlation thereof to determine uniform test and performance standards.

It is still another object of the invention to provide test apparatus for determining the microphonic response of a condenser after incorporation thereof into the radio receiver with which it is to be permanently associated.

It is a feature of the invention that test apparatus constructed in accordance therewith is adapted for the continuous indication of microphonic response, while probing in the condenser for the source of such microphonics.

To the foregoing general ends, there is provided a circuit arrangement for operating the condenser under test as a condenser-microphone, transforming the electrical signals derived therefrom into their acoustical equivalents, and feeding the acoustic signals back to the condenser, thereby causing the condenser under test to vibrate, or oscillate, at its predominant natural frequency.

The manner in which the various condenser characteristics are determined by means of the test apparatus hereinbefore outlined will become more clearly apparent from the following discussion when considered in conjunction with the accompanying drawing, wherein the single figure illustrates a preferred embodiment of condenser test apparatus constructed in accordance with the invention.

There is illustrated, in the figure, a condenser 10 which is under test, a test amplifier 11 connected thereto, an adjustable attenuator 12, an audio amplifier 13 and a loudspeaker 14. The elements recited are the components of a completely self-contained system wherein condenser 10 is disposed in close physical proximity to the mouth of loudspeaker 14. Specifically, in the preferred embodiment, the loudspeaker is disposed with its cone opening in a generally upward direction, a thin grounded metal plate 15 being laid across the open mouth thereof where it is bolted or otherwise retained in place, the condenser under test being placed directly on top of this plate. If desired, one of its terminals may be in electrical contact with plate 15. It will be understood that, if a large number of similar condensers are to be tested in quick succession, some suitable jig may be provided for positioning consecutive condensers in the same relative positions on top of plate 15. Test amplifier 11 is provided for the purpose of operating the condenser under test as a condenser microphone, so that vibration of its plates will be transformed into corresponding electrical signals suitable for amplification and renewed application to the loudspeaker 14. Amplifier 11 comprises essentially an amplifying triode 16, provided with a suitable source of positive plate potential B+. The test amplifier is provided with an input lead 17 which may be connected to the unground plate or plates of the condenser under test. Positive potential also derived from the source B+ is applied to these same ungrounded plates via voltage dropping resistors 18 and 19, the unidirectional potentials developed thereacross being kept from the grid of tube 16 by blocking condensers 20 and 21. All the components hereinbefore described as elements of the test amplifier are preferably contained within a single, electrically shielded inclosure and the input lead 17 is preferably kept as short as possible, these precautions being necessary to insure that stray capacitance will not obscure the capacitance variations of condenser 10. The attenuator 12 is connected to the output of test amplifier 11 and is preferably calibrated in some convenient units. The output of the attenuator is applied to a conventional audio amplifier 13 and the amplified output signals derived therefrom are returned to speaker 14.

The entire system thus forms a closed feedback loop whose operation is as follows: Random electrical fluctuations in either the test or the audio amplifier will cause the latter to emit a signal which in turn will produce an acoustical output from loudspeaker 14. This, in turn, will cause plate 15 to vibrate, the latter transmitting the vibrations to the adjacent plate of condenser 10. The variations in capacitance thus produced will cause the grid voltage of tube 16 to vary, with a resulting signal output from test amplifier 11 which is again fed back to loudspeaker 14, and thence via condenser 10, back to the test amplifier 11. If the attenuation of attenuator 12 is made sufficiently low and the gain of amplifier 13 sufficiently high, then the grain around the feedback loop will exceed unity, with the result that the system will begin to oscillate at the predominant natural frequency of mechanical vibration of condenser 10. This oscillation will manifest itself as a howl issuing from loudspeaker 14. The intensity of the howl is a function of the severity of the condenser microphonics and of the setting of attenuator 12. Since this arrangement does not depend, in any way, upon the electrical tuning effect of the condenser, it is preferably practical to probe into the condenser structure, at any point which may be accessible, in an effort to determine which portion of the condenser structure is responsible for the microphonics. The quality of various condensers with respect to their microphonic response may be determined by correlating the intensity of the microphonics with the setting of the attenuator for any given specimen. For example, one test procedure which has been followed in practice consists of placing a condenser on plate 15 in the manner hereinbefore described, connecting test amplifier 11 thereto and then decreasing the attenuation of attenuator 12 until microphonics are first observed in the system. This value of attenuation is noted and the attenuation then increased until the microphonics cease; the corresponding attenuation is again noted. For a variable condenser, this process is repeated for several discrete settings of the variable element. Since such tests yield results which can be easily and accurately reproduced on subsequent occasions, the two values of attenuation corresponding to the starting and stopping of the microphonics may be taken to be parameters indicative of the microphonic response quality of the condenser under test. Thus accurate comparisons can be made between various condensers, and their relative qualities with respect to microphonics accurately evaluated. In addition, it has been possible to determine, by probing, which portion of the condenser structure was responsible for the occurrence of microphonics, thereby rendering possible substantial improvements in their basic mechanical construction.

It will be understood that it is not essential, in practicing my invention, that the relative disposition of loudspeaker and condenser under test illustrated in the figure be maintained. It is, as a matter of fact, perfectly feasible to test the condenser subsequent to its installation in a radio receiver. In that case, the true operating conditions of the receiver may be very closely approximated by connecting the test amplifier to one set of condenser plates, grounding the other set of plates, connecting the output of the attenuator to the audio amplifier of the receiver, and using the speaker of the receiver, in its proper location in the receiver, to produce the desired mechanical vibration. Again the attenuator setting may be varied and the conditions for starting and stopping of microphonics observed, and the receiver arrangement rated accordingly.

It is clear that still other arrangements may occur to those skilled in the art. I, therefore, desire the scope of my inventive concept to be limited only by the appended claims.

I claim:

1. Test apparatus for determining the microphonic response of a capacitor, said apparatus comprising: an electrical circuit adapted to be connected to said capacitor and arranged to sense variations in the capacitance thereof due to vibration of the capacitor elements and further arranged to transform these sensed variations into an electrical signal having corresponding amplitude variations, an electronic amplifier arranged to amplify said electrical signal, a variable attenuator connected intermediate said electrical circuit and said amplifier, and a loudspeaker connected to the output of said amplifier and arranged to transform into mechanical vibrations the electrical signal output of said amplifier, said loudspeaker being adapted to be positioned in spatial proximity to said capacitor.

2. Test apparatus for determining the microphonic response of a capacitor, said apparatus comprising: a source of predetermined unidirectional potential, means for applying said potential across the terminals of a capacitor under test, the potential thus developed across said terminals being susceptible of variation in accordance with variations in the capacitance of said capacitor due to mechanical deformation of the capacitor elements, electrical amplifying means connected across said terminals and arranged to amplify said voltage variations, variable attenuating means arranged to control the amplitude of said voltage variations, a loudspeaker adapted to be disposed proximately to said capacitor, and means for applying the voltage variations derived from the output of said amplifying means to said loudspeaker to produce a corresponding acoustical output therefrom.

3. Apparatus according to claim 2, characterized in that said attenuating means has a range of attenuation sufficient to vary the overall gain of said apparatus from a value above to a value below unity for any practical capacitor.

4. Test apparatus for determining the microphonic response of a capacitor, said apparatus comprising: circuit means adapted to be connected to a capacitor under test for developing an electrical signal in response to mechanical vibration of the structures comprising said capacitor, means for amplifying said signal, means for regulating the amplitude of said amplified signal, an electromechanical transducer adapted to be disposed proximately to said capacitor, means for applying said amplified signal to said electromechanical transducer to produce corresponding mechanical vibrations therein, and a vibration-transmissive medium adapted to be disposed intermediate said transducer and said capacitor whereby said produced vibrations are transferred to said capacitor.

5. Apparatus for determining the microphonic response of a capacitor, said apparatus comprising: a source of unidirectional potential, means including an impedance for applying said potential to the terminals of a capacitor under test, a first amplifier connected to said terminals and arranged to amplify varying electrical signals developed thereacross in response to capacitance changes due to mechanical deformation of the structures comprising said capacitor, a variable attenuator connected to the output terminals of said first amplifier, a second amplifier connected to the output terminals of said attenuator, and a loudspeaker connected to and driven by the signal derived from said second amplifier, said loudspeaker being disposed in such proximate spatial relation to said capacitor as to bring said capacitor substantially within the path of acoustical energy issuing from said loudspeaker.

6. Apparatus according to claim 5 characterized in that the range of attenuation provided by said variable attenuator is sufficiently wide to permit variation of the overall gain of the apparatus from a value below unity to a value above unity for any practical capacitor.

7. Apparatus according to claim 5 characterized in that said means for applying said potential to said capacitor terminals and said first amplifier are capacitively shielded.

GEORGE O. SMITH.

REFERENCES CITED

The following references are of record in the file of this patent:

UNITED STATES PATENTS

| Number | Name | Date |
|---|---|---|
| 2,025,719 | Blau et al. | Dec. 31, 1935 |
| 2,403,999 | Read et al. | July 16, 1946 |
| 2,500,764 | Macgeorge | Mar. 14, 1950 |
| 2,576,423 | Stewart | Nov. 27, 1951 |